(12) United States Patent
Aschoff et al.

(10) Patent No.: US 10,785,580 B2
(45) Date of Patent: Sep. 22, 2020

(54) METHOD FOR ADJUSTING PARAMETERS OF A HEARING SYSTEM AND HEARING SYSTEM

(71) Applicant: SIVANTOS PTE. LTD., Singapore (SG)

(72) Inventors: Stefan Aschoff, Eckental (DE); Roland Weidner, Eggolsheim (DE); Markus Mueller, Schwaig (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 16/278,970

(22) Filed: Feb. 19, 2019

(65) Prior Publication Data

US 2019/0261096 A1 Aug. 22, 2019

(30) Foreign Application Priority Data

Feb. 16, 2018 (DE) .................. 10 2018 202 429

(51) Int. Cl.
*H04R 25/00* (2006.01)
*G06T 7/70* (2017.01)

(52) U.S. Cl.
CPC ............ *H04R 25/505* (2013.01); *G06T 7/70* (2017.01); *H04R 25/50* (2013.01); *H04R 25/55* (2013.01); *H04R 25/558* (2013.01); *H04R 25/70* (2013.01); *G06T 2207/20081* (2013.01); *G06T 2207/20084* (2013.01); *H04R 25/554* (2013.01); *H04R 25/658* (2013.01); *H04R 2225/43* (2013.01); *H04R 2225/55* (2013.01)

(58) Field of Classification Search
CPC . G06T 7/70; G06T 2207/20084; H04R 25/50; H04R 25/55; H04R 25/558; H04R 25/70; H04R 25/554; H04R 25/658; H04R 2225/43; H04R 2225/55
USPC .................................................... 381/314, 60
See application file for complete search history.

(56) References Cited

U.S. PATENT DOCUMENTS

| 8,654,986 | B2 | 2/2014 | Catoira |
| 10,187,733 | B2 | 1/2019 | Schneider et al. |
| 10,348,891 | B2 * | 7/2019 | Manchester ........... G16H 20/30 |
| 2010/0217684 | A1 | 8/2010 | Melcher et al. |
| 2014/0146974 | A1 * | 5/2014 | Krueger ................ H04R 25/30 381/60 |

(Continued)

FOREIGN PATENT DOCUMENTS

| DE | 102014218832 A1 | 3/2016 |
| EP | 3039886 A1 | 7/2016 |

(Continued)

*Primary Examiner* — Phylesha Dabney
(74) *Attorney, Agent, or Firm* — Laurence A. Greenberg; Werner H. Stemer; Ralph E. Locher (57) ABSTRACT

A method adjusts parameters of a hearing system which has a hearing aid device and a communication device, which is separate from the hearing aid device. A component for acoustic coupling of the hearing aid device to the ear of a hearing-aid wearer is fitted to the hearing aid device. A camera of the communication device is used to capture at least one image of the component used for acoustic coupling. A product identity of the component is identified from the captured image and acoustic transfer characteristics are assigned to the previously identified component. The parameters of the hearing system are adjusted on the basis of these acoustic transfer characteristics.

21 Claims, 2 Drawing Sheets

(56) References Cited

U.S. PATENT DOCUMENTS

2017/0111950 A1   4/2017   Muelder

FOREIGN PATENT DOCUMENTS

| EP | 3123355 A1 | 2/2017 |
| EP | 3435689 A1 | 1/2019 |
| WO | 2015028050 A1 | 3/2015 |
| WO | 2015144192 A1 | 10/2015 |

* cited by examiner

METHOD FOR ADJUSTING PARAMETERS OF A HEARING SYSTEM AND HEARING SYSTEM

CROSS-REFERENCE TO RELATED APPLICATION

This application claims the priority, under 35 U.S.C. § 119, of German application DE 10 2018 202 429.4, filed Feb. 16, 2018 16, 2018; the prior application is herewith incorporated by reference in its entirety.

BACKGROUND OF THE INVENTION

Field of the Invention

The invention relates to a method for adjusting parameters of a hearing system containing a hearing aid device and a communication device. The invention also relates to a hearing system containing a hearing aid device and a communication device, wherein the parameters of the hearing system can be adjusted.

A hearing aid device refers generally to a portable hearing apparatus that is used to improve the perception of ambient sound impinging on the ear of a user. A subclass of hearing aid devices typically referred to as "hearing aids" is configured to be fitted for people who are suffering from hearing loss in the medical sense. In order to accommodate their numerous individual needs, different designs of hearing aid devices are provided such as behind-the-ear (BTE) hearing aids, hearing aids having an external receiver (RIC: receiver in the canal), in-the-ear hearing aids (ITE), or even concha hearing aids or in-the-canal hearing aids (CIC). The hearing aids cited by way of example are worn on the outer ear or in the auditory canal. In addition, there are also bone-conduction hearing aids, implant hearing aids or vibrotactile hearing aids available on the market. In these hearing aids, stimulation of the impaired hearing is performed either mechanically or electrically.

Nowadays, a hearing system (or even hearing-aid system) usually no longer contains just one such hearing aid device but also additional communication devices such as a computer, a tablet or a smartphone, which are normally connected wirelessly to the hearing aid device. The communication device(s) often act in this case as a user interface to the hearing aid device, and provide this device with various functions. For instance, a communication device can be used as a remote control or as a display device for statuses of the hearing aid device (for example the battery status, settings for parameters such as signal beeps, or outputs of statistically processed data acquired by the hearing aid device). In addition, communication devices are used as input media for assessing the satisfaction with the performance of the hearing aid device, for communicating with a hearing-aid audiologist, or for coupling the communication device to the adjustment software of the hearing-aid audiologist for remote adjustment of the parameters of the hearing aid.

In particular, traditional hearing aids often additionally comprise components that are used for acoustic coupling of the particular hearing aid to the ear of the hearing-aid wearer, i.e. ensure that the emitted sound is fed into the ear. These components are usually fitted on the hearing aid by a trained hearing-aid audiologist. There is typically a large selection of such adapters. Various parts are eligible as these adapters depending on the hearing aid design. For traditional BTE hearing aids, the receiver (loudspeaker) is located in the hearing-aid housing. At the output aperture is first connected a sound tube, to the end of which is then attached a small cap, which centers the tube end in the auditory canal of the hearing-impaired person.

For RIC hearing aids, the loudspeaker lies outside the hearing-aid housing, to which it is connected by a thin wire. Various designs of domes, as they are called, are used to center the loudspeaker in the auditory canal. Since the auditory canals of the various hearing-aid wearers vary in size, these domes are available with different diameters and each with differently sized ventilation holes for venting the internal auditory canal. Such ventilation holes are needed to ensure venting of the auditory canal of the hearing-aid wearer. The presence of ventilation holes, however, is also associated with disadvantages, because at least some of the sound emitted by the hearing aid can escape through the ventilation holes. This not only results in a loss of performance but also increases the tendency of the hearing aid to feedback. Attenuation effects can also be a factor, because the sound line in a tube between a hearing-aid loudspeaker and a corresponding adapter is lossy.

There is also the option for a hearing-aid audiologist to make a custom earmold for a hearing-aid wearer, which the audiologist produces by impressing a molding material onto the ear. Such an earmold has an ideal fit, provides a tight seal and therefore is also provided with a ventilation hole.

Overall, the choice of the components that are used for acoustic adjustment of the hearing aid has a significant impact on the sound reaching the ear. The transfer losses involved are usually identified according to frequency in the form of a curve or 'characteristic'.

Before a hearing-impaired person is fitted with a hearing aid (device) for the first time, the required gain of the hearing aid is calculated, taking into account the measured hearing loss of the hearing-aid wearer. Generally known formulas such as, for example, DSLI/O, NAL-NL1 or the like, are commonly used for this calculation. The manufacturers of hearing systems, however, are increasingly developing proprietary calculation formulas that take into account additionally, and/or additional, special features of the hearing aids developed by the particular manufacturer.

Other methods are also suitable, however, for defining the target gain of a hearing system. For instance, acceptable results are also achieved in practice when a hearing-impaired person is assigned to a cluster group, which is in turn assigned an associated target gain. In this case, the target gain is calculated according to frequency, for instance for the center frequency of each gain channel of the hearing aid. The target gains turn out to be different here for input levels or different amplitude, because a hearing aid is meant to amplify quiet sounds more strongly than moderate or loud sounds (dynamic compression). Thus a target gain represents the quotient of the output level, i.e. the sound level at the point at which the sound leaves the hearing aid (including its components for acoustic coupling), and the input level, i.e. the sound level picked up by the microphone of the hearing aid.

Since, however, the various components for acoustic coupling that are connected to the hearing aid (device) have different transfer losses, the specific losses of these components must also be taken into account. The receivers (loudspeakers) of the hearing aid must compensate for the particular loss, i.e. the transfer losses produced by the components for acoustic coupling of the hearing aid (acoustic coupling components) must be applied to the target gain. In practice, a suitable adjustment program ensures that hearing aid parameters are adjusted to take this into account.

Irrespective of the type of the hearing aid, the acoustic adjustment that is optimum for a hearing-aid wearer is not always concluded with the first selection of the particular acoustic coupling component. A component used for acoustic coupling may need to be replaced or changed, for instance when a dome of slightly too small or too large a diameter fits too loosely or too tightly. In addition, it may be found uncomfortable to wear a dome or an earmold because there is no ventilation hole and the skin sweats, and it then works loose more easily because of the sweat buildup. Similarly, the ventilation hole may be too large in size, with the result that too much of the deep sound escapes or the escaping sound is coupled into the microphone and results in unpleasant feedback.

There are various ways of ensuring here that the hearing aid is fitted as needed for a hearing-aid wearer and suitably adjusted to the hearing of a hearing-aid wearer. One option is for the hearing-aid wearer to have his hearing aid adjusted at the premises of a hearing-aid audiologist. This often involves greater time and effort, however, in particular with regard to arranging an appointment, getting to the appointment and potential waiting times.

Alternatively, it is possible for a hearing-aid audiologist to support a hearing-aid wearer remotely. In this case, the hearing-aid audiologist is linked to the hearing-aid wearer by suitable technology such as systems for remote adjustment of hearing aids, audio transmission and/or video transmission, for example. Another possibility is that no support at all is provided to the hearing-aid wearer or else recourse is made to assistance from an untrained or semi-professionally trained person. These may be family members, employees of a drugstore or shopping mall or even "barefoot doctors", who have additional brief basic training in assembling and adjusting hearing aids.

In the aforementioned applications, the assembly process quickly hits practical limits. When a hearing-aid audiologist is supporting the hearing-aid wearer, for instance by video transmission, although it is possible for the coupling pieces to be attached to the hearing aid at the location of the hearing-aid wearer, there is always a risk associated with the transfer to the hearing-aid audiologist of information about which components have been connected exactly. Although the hearing-aid wearer can name the component he has selected from a range of different coupling pieces that he is offered, it is not possible to rule out incorrect connections or components being mixed up.

Even if the hearing-aid wearer captures the particular coupling component using a webcam and conveys this to a hearing-aid audiologist providing support, an unsuitable orientation of the camera, inadequate lighting conditions or else the resolution limit of the webcam can make it difficult for the hearing-aid audiologist providing support to assign to a component that has been selected for the coupling, the product name unique to this component.

Incorrect information is even more likely if an untrained person or a person working semi-professionally, such as a drugstore employee or a barefoot doctor, is supporting the hearing-aid wearer rather than a professional hearing-aid audiologist. These people are less familiar with the range of components from a manufacturer than a hearing-aid audiologist employed full-time who is concerned solely with adjusting hearing aids. In this case, the more the manufacturer introduces new components and component forms to the market as a result of model changes, the less will be the familiarity with the range of coupling components. There is accordingly a high risk of choosing an incorrect acoustic coupling component or of assembling incorrectly on a hearing aid (device).

Even printing on product names or product codes is impractical because of the small dimensions of the parts and the material from which they are made (usually soft and transparent plastics).

The methods described above are therefore only suitable to a limited extent for adjusting a hearing-aid system.

SUMMARY OF THE INVENTION

Hence the object of the invention is to make it possible for a hearing-aid wearer to set parameters of his hearing aid in a user-friendly manner and largely without mistakes.

This object is achieved according to the invention by a method having the features of the main method claim and by a hearing system having the features of the main system claim. The dependent claims and the description below present advantageous embodiments and developments, some of which are inventive in their own right.

In the method according to the invention for adapting parameters of a hearing system containing a hearing aid device and a communication device, which is separate from the hearing aid device. A camera is used to capture at least one image of at least one component for acoustic coupling of the hearing aid to the ear of a hearing-aid wearer. A product identity of the, or each, component is identified from the, or each, captured image. Finally, acoustic transfer characteristics, which form the basis for adjusting the parameters of the hearing system, are assigned to the, or each, identified component. The method according to the invention ensures correct assembly even when there is no professionally trained hearing-aid audiologist on the spot. At least for the standard operation of the hearing aid device, the, or each, component is fitted on the hearing aid device. In an advantageous embodiment of the method, the, or each, component can be fitted to the hearing aid device also for capturing the at least one image.

In the method, the parameters of the hearing aid (device), i.e. of the part of the hearing system positioned in and/or on the ear of a hearing-aid wearer, are advantageously adjusted to the hearing of the particular hearing-aid wearer. Depending on the design of the hearing aid, sound tubes containing domes and/or earmolds are preferably used as the components for acoustic coupling of the hearing aid to the ear of a hearing-aid wearer. The hearing aid is thereby assembled especially for the user-specific use.

A camera of the communication device of the hearing system is used to identify a component for acoustic coupling according to the present invention. At least one image of the, or each, component used for acoustic coupling is captured using the camera of the communication device. According to the invention, a smartphone as the communication device is preferably part of the hearing system. Alternatively or additionally, according to the invention, it is also possible to utilize, for example, a computer or a tablet as part of the hearing system, which computer or tablet is used to capture one or more images of the, or each, component used for acoustic coupling.

The product identity of the, or each, component is then identified from the, or each, captured image. This is done by transferring the, or each, captured image preferably via the Internet to a server or to a Cloud. The transfer is preferably performed automatically. Then image recognition software stored on the server or in the Cloud is advantageously used to identify the product identities of the respective components fitted to the hearing aid for the purpose of acoustic coupling. Again this identification is preferably performed automatically according to the invention. Alternatively, the image recognition can take place on the communication device, and in this case preferably implemented by an artificial neural network, in which the various product identities and their assignments are stored on the basis of connections between individual neurons of the artificial neural network.

In an advantageous embodiment of the method, the at least one component for acoustic coupling of the hearing aid to the ear of a hearing-aid wearer is first fitted to the hearing aid device. Then the camera of the communication device is used to capture the at least one image of the, or each, component used for acoustic coupling, and the product identity of the, or each, component is identified from the, or each, captured image. This has the advantage that the hearing aid device is actually being worn during the adjustment process and thus the adjustment can be tested directly should a fine adjustment still be needed, for instance as a consequence of particular anatomical features of the auditory canal of the hearing-aid wearer. Furthermore, for a component already fitted on the hearing aid device, it is easier to define by means of the hearing aid device a standard position that is particularly suitable for the image recognition, which can help to simplify the image recognition.

In an alternative embodiment, the at least one image of the, or each, component is captured while the, or each, component is separate from the hearing aid device. This approach has the advantage that in the image, the hearing aid device is not concealing any details that are particularly relevant to the identification.

The image recognition software recognizes the components shown on the, or each, transferred image, and then compares the, or each, recognized image with images in an electronic product catalog. Again this method step is preferably performed automatically. The electronic product catalog is advantageously likewise stored on the server or in the Cloud. Alternatively, the electronic product catalog can also be stored in the communication device. The electronic product catalog advantageously is regularly updated automatically. This ensures that the product catalog is always up to date and also holds products newly brought onto the market by a hearing aid manufacturer.

The product identity of the, or each, component can be identified from the, or each, captured image in particular on the communication device by an artificial neural network implemented there, by which the electronic product catalog is stored. It is thereby possible to perform image recognition for identifying the product identity without the, or each, image to be analyzed having to be transferred first by Internet to a server. It is advantageous to classify images on the communication device particularly when there is only a low data transfer rate available that might make an image transfer seem to take an inconveniently long time for the user. In particular in this case, the communication device can be embodied as a smartphone or a tablet, on which is installed a suitable application for identifying the product identity of the at least one component from the, or each, image. The application is preferably coupled via a suitable interface to a further application for adjusting the hearing aid device, or is implemented as part of this application.

In order to recognize the product identities, an artificial neural network is implemented on the communication device in this case. The structure of the artificial neural network is based on a brain as a biological model. It therefore contains a multiplicity of circuits, which mimic neurons (and therefore are also called neurons in the artificial neural network), and a plurality of connections, which mimic synapses (the connections between the neurons).

A multiplicity of topologies, i.e. the arrangements defining how the neurons of the artificial neural network are connected to one another, share the common feature that they comprise a plurality of layers of neurons, in which an input layer of neurons receives signals from outside the artificial neural network, each signal as an input, and an output layer of neurons outputs signals as results to the outside. A number of additional layers can lie between said input layer and output layer. The capability of the artificial neural network to handle set tasks is governed by the number of neurons in the individual layers and the complexity of each of the layers.

Signals that are output from individual pixels of an image sensor in the communication device are fed to the input layer. The signal strengths of output signals output at the neurons of the output layer represent the identification result, with one neuron of the output layer representing one of the possible identification results.

Different products in the electronic product catalog, and preferably different image representations for each product, are preferably stored via connections between individual neurons and/or via individual neurons of an output layer of the artificial neural network. The totality of these connections can be transferred to the communication device for the purpose of implementing the artificial neural network corresponding to the product catalog.

It is advantageous here to implement the artificial neural network in the communication device by means of at least one neuromorphic chip. Neuromorphic chips are microchips that by virtue of their physical circuit topology are particular suitable for implementing artificial neural networks. In particular it is possible here to configure a physical implementation of at least one layer of neurons and a multiplicity of physical connections therebetween. In addition, the neuromorphic chip can comprise, or be connected to, a memory in which, in order to implement a specific artificial neural network, are stored the coupling strengths of the individual connections of the network to be implemented, so that these can be implemented, in particular layer by layer, in the physical connections of the neuromorphic chip.

Neuromorphic chips are currently being deployed in the first smartphone models available on the market, and it may hence be assumed that wider availability in the relevant market segment is likely to happen in the near future and also that the deployment of neuromorphic chips in tablets should follow. Thus the neuromorphic chips are available currently for said smartphone models and probably in the near future for far more models, and then indeed for a large number of tablet models.

In a training phase, separate from the hearing system, images of each of the products in the electronic product catalog are preferably captured, wherein a generic artificial neural network is configured for image recognition of the respective products in the captured images, and thereby a first neural specimen network is adjusted and implemented. The topology and/or connections between individual neurons of the first neural specimen network is saved in a first file, wherein the first file is transferred to the communication device, and wherein in the communication device, the artificial neural network of the communication device is implemented in accordance with the topology saved in the first file and/or the connections of the first neural specimen network, and the electronic product catalog is thereby stored in the communication device.

In the training phase, the transfer properties, i.e. in particular the "transfer weights" of the connections between the neurons of the first neural specimen network, are configured. This can be done in particular by the generic artificial neural network being implemented iteratively by image recognition of the individual product identities from respective captured images, with errors in the recognition being corrected for a subsequent iteration step. The captured images are fed to the input layer of the generic artificial neural network, and during the training phase a continuous check is performed to ascertain whether the correct product identity is output at the output layer of the generic artificial neural network. In this phase, suitable correction of the output in the event of an error ("backpropagation") adjusts in particular the "transfer weights" of the connections for the intended use. In particular, the first neural specimen network "trained" for recognizing the product identities of the products presented in the product catalog is thereby implemented.

The configurations can be exported, so that another artificial neural network is placed into the "trained state" by implementing the same topology and the same configuration, in other words the first neural specimen network is reproduced. The artificial neural network of the communication device can hence implement by means of the first file, the configuration of the first neural specimen network and thereby access the "training progress" of this network. The first file can be stored in particular by the manufacturer of the hearing aid device on a server, from where it can be downloaded by the hearing-aid wearer.

For a change to the electronic product catalog, a second neural specimen network corresponding to the modified electronic product catalog is preferably generated, in particular in a manner similar to that just described, the topology and/or connections of which network are saved in a second file, wherein the second file is transferred to the communication device, and wherein the electronic product catalog in the communication device is modified by implementing the second neural specimen network in the communication device on the basis of the second file. The product catalog can thereby be updated by a simple download of the second file.

Advantageously, the acoustic transfer functions for the, or each, identified component are retrieved from the electronic product catalog. In other words, the acoustic transfer characteristics are stored in the electronic product catalog, and after the relevant component is identified, are assigned, in particular automatically, to this component.

Then, according to the invention, the acoustic transfer characteristics for the, or each, identified component are transferred to the communication device. The transfer is advantageously performed via the Internet and in particular likewise automatically, i.e. without any additional action by the hearing-aid wearer or the wearer of the hearing system. The acoustic transfer characteristics are then advantageously transferred from the communication device to the hearing aid of the hearing system and saved there. Again this transfer and subsequent saving are advantageously performed automatically. If the image recognition for identifying the, or each, component provided or fitted for the purpose of acoustic coupling is performed locally in the communication device, then the transfer characteristics can each be assigned to individual product identities from the electronic product catalog, preferably transferred in advance to the communication device, and stored there in a memory.

In addition, in an advantageous embodiment of the invention, a gain characteristic for the hearing aid of the hearing system is calculated and, in particular, also transferred thereto. The gain characteristic is advantageously calculated by suitable adjustment software. In a preferred variant of the invention, this adjustment software is likewise stored on the communication device. The gain characteristic for the hearing aid is thus calculated by the communication device in this case.

It is alternatively preferred that the gain characteristic is calculated by adjustment software installed on the computer of a hearing-aid audiologist and connected via the Internet to the communication device of the hearing system of the hearing-aid wearer. It is also advantageous according to the invention if the gain characteristic is calculated by a Cloud service or by adjustment software stored there that can be accessed via the Internet by means of a web browser. This approach is advantageous in particular if the image recognition of the, or each, component provided or fitted for the purpose of acoustic coupling is also performed in a Cloud service, in particular the same Cloud service. Nevertheless, also usage in combination with local image recognition on the communication device is not ruled out. Preferably in this case, the communication device transfers to the server of the Cloud service the data regarding the product identity of the, or each, component that is needed for calculating the gain characteristics.

The calculation of the gain characteristic advantageously does not include applying the transfer characteristics of the components for acoustic coupling connected to the hearing aid. In this case, the calculation of the target gain of the hearing aid, i.e. of the gain characteristic, is based on an in particular simplified adjustment algorithm, because this algorithm does not need to perform curve arithmetic in order to apply the transfer characteristics of the acoustic coupling parts to the target gain.

In a preferred embodiment of the invention, the gain characteristic calculated by the adjustment software is transferred to the hearing aid. The transfer is made advantageously either from the communication device, from a computer of a hearing-aid audiologist or from a server or a Cloud.

A corrected gain characteristic for the hearing aid is then preferably calculated from the acoustic transfer characteristics and the gain characteristic. The corrected gain characteristic is advantageously calculated in the hearing aid by adding the acoustic transfer characteristics of the coupling components onto the gain characteristic calculated by the adjustment software. The actual gain of the hearing aid is preferably adjusted on the basis of this corrected gain characteristic. Thus the hearing aid sets the gain according to the recalculated, corrected gain characteristic. The gain is likewise advantageously set automatically. The transfer characteristics used for the hearing aid adjustment algorithm are thereby always up to date because they are transferred directly from the manufacturer (server). The corrected gain characteristic can be calculated in particular, however, also on the communication device, preferably using a suitable application for adjusting the hearing aid, and then transferred to the hearing aid.

Advantageously, the at least one image of the component is captured while the hearing-aid wearer is not wearing this component on the ear. This improves the image recognition because the, or each, image can depict the component in isolation or, if applicable, in combination with the hearing aid device, but in any case without a visually complex background. Moreover, an image capture of this type can be performed far more conveniently.

The method according to the invention thus makes it possible for a hearing-aid wearer to adjust parameters of his hearing aid effectively, easily and with little effort. As regards assembling the hearing aid, no additional effort is required on the part of the hearing-aid wearer. In addition, there is no need for an appointment at the premises of a hearing-aid audiologist and/or to call on the assistance of an outside person. Both laypeople and people working semi-professionally can perform the assembly of the acoustic coupling parts onto a hearing aid, because the system relieves them of identifying the fitted parts, determining the acoustic properties thereof and transferring said properties into the hearing aid adjustment algorithm.

The hearing system according to the invention contains a hearing aid having at least one component for acoustic coupling of the hearing aid device to the ear of a hearing-aid wearer, has a communication device, which is separate from the hearing aid device, and has a camera for capturing at least one image of the, or each, component used for acoustic coupling. The hearing system is configured to identify the product identity of the, or each, component from the, or each, captured image, and to assign acoustic transfer characteristics to the, or each, previously identified component, wherein the parameters of the hearing system can be adjusted on the basis of the acoustic transfer characteristics.

The advantages and preferred embodiments described for the method according to the invention apply likewise to the hearing system according to the invention, and can accordingly be applied analogously to the hearing system.

In an advantageous embodiment, the communication device contains a neuromorphic chip for implementing an artificial neural network, on the basis of which is implemented an electronic product catalog having various product identities. The identification of the product identity from the, or each, captured image can hence be performed directly on the communication device without the risk of time being lost for any transfer of the, or each, image to an external server.

Other features which are considered as characteristic for the invention are set forth in the appended claims.

Although the invention is illustrated and described herein as embodied in a method for adjusting parameters of a hearing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts and variables are denoted consistently by the same reference signs.

Figure 1:
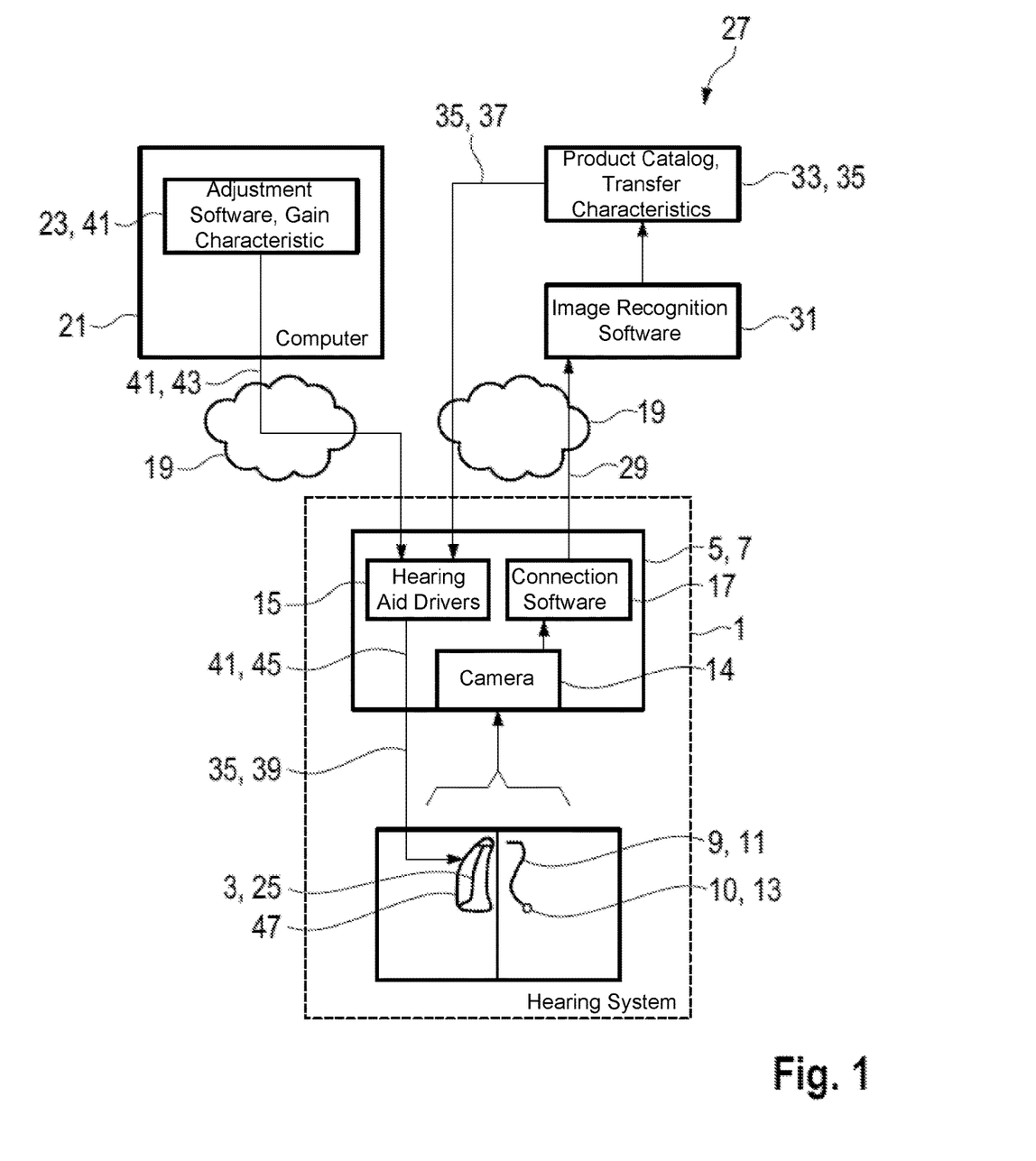
FIG. 1 is a diagrammatic, block diagram of an adjustment of a hearing aid, wherein a sound tube to be connected is recognized on a server by use of image recognition, and acoustic data for the adjustment for the sound tube is imported from the server.

Referring now to the figures of the drawings in detail and first, particularly to FIG. 1 thereof, there is shown a hearing system 1 having a hearing aid 3 and a communication device 7 embodied as a smartphone 5 and connected wirelessly to the hearing aid 3. The hearing aid 3, in the present case in the form of a BTE hearing aid, is equipped with components 9, 10 for acoustic coupling to the ear of a hearing-aid wearer. These components are a sound tube 11 together with a dome 13.

The smartphone 5 has a camera 14. In addition, hearing aid drivers 15 and connection software 17 are stored on the smartphone 5. The connection software 17 allows the smartphone 5 to be connected to the Internet (denoted by 19). Also shown here is a computer 21 of a hearing-aid audiologist, on which computer adjustment software 23 is installed. The computer 21 is connected to the smartphone 5 via the Internet.

In accordance with the method, in a first step, the hearing aid 3 is assembled for use by connecting, as the respective components 9, 10 for acoustic coupling, the sound tube 11 together with the dome 13 for acoustic coupling to the hearing-aid housing 25. Images of the components 9, 10 are captured using the camera 14 of the smartphone 5, and the captured images are transferred via the Internet to a server 27 (transfer direction denoted by arrow 29). Stored on the server 27 is image recognition software 31, which is used to identify the product identities of the components 9, 10 arranged on the hearing aid.

From an electronic product catalog 33, likewise stored on the server 27, are retrieved the acoustic transfer characteristics 35 for the identified components 9, 10. The acoustic transfer characteristics 35 are transferred via the Internet to the smartphone 5 (transfer direction denoted by arrow 37) and from here to the hearing aid 3 (transfer direction denoted by arrow 39). The acoustic transfer characteristics 35 are then saved in the hearing aid 3.

In addition, the adjustment software 23 installed on the computer 21 of the hearing-aid audiologist is used to calculate a gain characteristic 41 for the hearing aid 3. This calculation does not include applying the transfer characteristics of the components 9, 10 for acoustic coupling connected to the hearing aid 3. The calculated gain characteristic 41 is transferred via the Internet from the computer 21 to the smartphone 5 (transfer direction denoted by arrow 43) and from here to the hearing aid 3 (transfer direction denoted by arrow 45).

Finally, the hearing aid 3 adds the acoustic transfer characteristics 35 of the sound tube 11 and of the dome 13 onto the received gain characteristic 41, and sets the gain of the hearing aid 3 according to the recalculated gain characteristic 47.

Figure 2:
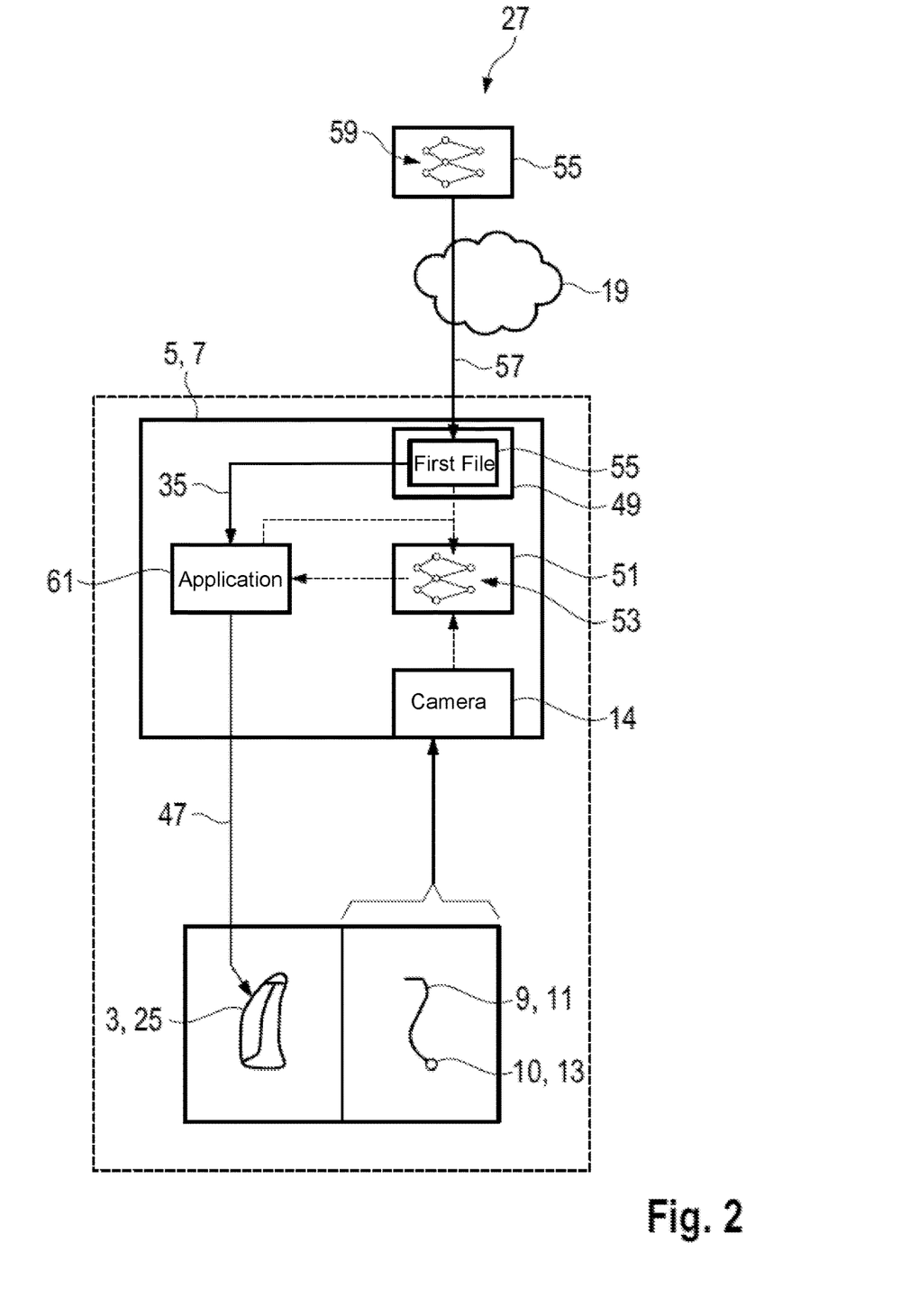
FIG. 2 is a block diagram of an alternative embodiment of the method of FIG. 1, wherein the image recognition is performed on a smartphone.

FIG. 2 shows the hearing system 1 of FIG. 1, with a non-volatile memory 49 and a neuromorphic chip 51 disposed on the smartphone 5. An artificial neural network 53 can be implemented in the smartphone 5 by means of the neuromorphic chip 51. For this purpose, a first file 55 is downloaded via the Internet (denoted by 19) from the server 27 to the smartphone (transfer direction denoted by arrow 57), in which file is stored the complete configuration, i.e. in particular the topology of the individual layers, the numbers of neurons in each layer and the connection strengths between individual neurons, for a first neural specimen network 59. The first neural specimen network 59 has been implemented here by the manufacturer in a training phase (not shown further here), and constitutes the training result from a generic artificial neural network that has been "trained" for image recognition of the individual products of the product catalog 33. Transferring the first file 55 to the smartphone 5 and saving there in the non-volatile memory 49 means that the data characterizing the first neural specimen network 59 is now also available on the smartphone 5, so that given a suitable use, the artificial neural network 53, which corresponds to the first neural specimen network 59, can be implemented in the smartphone 5 by the neuromorphic chip 51 for image recognition of the individual products of the product catalog 33. In this case, the transfer characteristics 35 assigned to the individual products of the product catalog 33 are also additionally stored in the non-volatile memory 49 as part of the first file 55.

According to the method, the camera 14 of the smartphone 5 is now used to capture images of the components 9, 10, in a similar way to the procedure shown in FIG. 1. In this case, the image of the sound tube 11 together with the dome 13 is here captured without any prior connection to the hearing-aid housing 25. Depending on the embodiment of the first file, however, the underlying first neural specimen network 59 can also be designed on the basis of image recognition of components 9, 10 each connected to the hearing-aid housing 25. The application 61 can be used to identify the product identities of the components 9, 10 from the captured images, for which purpose the application 61 controls in particular the implementation of the artificial neural network 53, which corresponds to the first neural specimen network 59, and which is implemented on the neuromorphic chip 51 on the basis of the first file 55 for identifying the product identities in the product catalog 33. Once the product identity of the components 9, 10 has been identified, the associated transfer characteristics 35 can be read from the first file 55. If applicable, these functions can also be read from a further file (not shown), assigned to the first file 55, if the data for the first neural specimen network 59 is saved separately from the data for the transfer characteristics 35.

The gain characteristic 41 for the hearing aid 3 can now likewise be calculated by the application 61. This calculation does not include applying the transfer characteristics of the components 9, 10 for acoustic coupling connected to the hearing aid 3. Finally, the application 61 in the hearing aid 3 adds the acoustic transfer characteristics 35 of the sound tube 11 and of the dome 13 onto the calculated gain characteristic 41, and sets the gain of the hearing aid 3 according to the recalculated gain characteristic 47 in a similar manner to the procedure described with reference to FIG. 1.

For standard operation of the hearing aid 3, the sound tube 11 together with the dome 13 is fitted to the hearing-aid housing 25. The product catalog 33 stored on the smartphone and the corresponding image recognition can be updated by simple downloading of a second file (not shown further) from the server 27 into the non-volatile memory, thereby enabling the smartphone to implement a second neural specimen network, which corresponds to the modified product catalog.

The exemplary embodiments described above explain the invention particularly clearly, but nonetheless do not limit the invention. In fact further embodiments of the invention can be derived from the claims and the above description.

The following is a summary list of reference numerals and the corresponding structure used in the above description of the invention:
1 hearing system
3 hearing aid
5 smartphone
7 communication device
9 component for acoustic coupling
10 component for acoustic coupling
11 sound tube
13 dome
14 camera
15 hearing aid driver
17 connection software
19 Internet
21 computer
23 adjustment software
25 hearing-aid housing
27 server
29 transfer direction
31 image recognition software
33 electronic product catalog
35 transfer characteristics
37 transfer direction
39 transfer direction
41 gain characteristic
43 transfer direction
45 transfer direction
47 corrected gain characteristic
49 non-volatile memory
51 neuromorphic chip
53 artificial neural network
55 first file
57 transfer direction
59 first neural specimen network
61 application

The invention claimed is:

1. A method for adjusting parameters of a hearing system having a hearing aid device and a communication device being separate from the hearing aid device, which comprises the steps of:
    using a camera of the communication device to capture at least one image of at least one component for acoustic coupling of the hearing aid device to an ear of a hearing-aid wearer;
    identifying a product identity of the component from a captured image;
    assigning acoustic transfer characteristics to an identified component; and
    adjusting the parameters of the hearing system on a basis of the acoustic transfer characteristics; and
    capturing the at least one image of the component while the component is separate from the hearing aid device.

2. The method according to claim 1, which further comprises:
    fitting the at least one component for acoustic coupling of the hearing aid device to the ear of the hearing-aid wearer, to the hearing aid device; and
    using the camera of the communication device to capture the at least one image of the component used for acoustic coupling.

3. The method according to claim 1, which further comprises transferring the captured image via an Internet to a server storing an electronic product catalog.

4. The method according to claim 3, which further comprises retrieving the acoustic transfer characteristics for the identified component from the electronic product catalog.

5. The method according claim 1, which further comprises identifying the product identity of the component from the captured image on the communication device by means of an artificial neural network implemented there, by means of which an electronic product catalog is stored.

6. The method according to claim 5, wherein the artificial neural network in the communication device is implemented by means of at least one neuromorphic chip.

7. The method according to claim 5, which further comprises storing different products in the electronic product catalog via connections between individual neurons and/or via individual neurons of an output layer of the artificial neural network.

8. The method according to claim 7, wherein in a training phase, separate from the hearing system performing the additional steps of:
capturing images of each of the products in the electronic product catalog;
configuring a generic artificial neural network for image recognition of respective products in captured images, and thereby a first neural specimen network is implemented, wherein a topology and/or connections between individual neurons of the first neural specimen network is saved in a first file; and
transferring the first file to the communication device, and wherein in the communication device, the artificial neural network of the communication device is implemented in accordance with the topology saved in the first file and/or the connections of the first neural specimen network, and the electronic product catalog is thereby stored in the communication device.

9. The method according to claim 8, wherein for a change to the electronic product catalog, performing the following steps of:
generating a second neural specimen network corresponding to a modified electronic product catalog, a topology and/or connections of the second neural specimen network are saved in a second file;
transferring the second file to the communication device; and
modifying the electronic product catalog in the communication device by implementing the second neural specimen network in the communication device on a basis of the second file.

10. The method according to claim 1, which further comprises transferring the acoustic transfer characteristics for the identified component to the communication device.

11. The method according to claim 1, which further comprises calculating a gain characteristic for the hearing aid.

12. The method according to claim 11, which further comprises calculating the gain characteristic for the hearing aid by the communication device.

13. The method according to claim 11, which further comprises calculating a corrected gain characteristic for the hearing aid from the acoustic transfer characteristics and the gain characteristic.

14. The method according to claim 13, which further comprises adjusting a gain of the hearing aid on a basis of the corrected gain characteristic.

15. The method according to claim 1, which further comprises capturing the at least one image of the component while the hearing-aid wearer is not wearing the component on the ear.

16. A hearing system, comprising:
a hearing aid device having at least one component for acoustic coupling of said hearing aid device to an ear of a hearing-aid wearer;
a communication device, being separate from said hearing aid device, and having a camera for capturing at least one image of the component used for acoustic coupling;
the hearing system is configured to identify a product identity of said component from a captured image, and to assign acoustic transfer characteristics to a previously identified component, and parameters of the hearing system can be adjusted on a basis of the acoustic transfer characteristics; and
said communication device having a neuromorphic chip for implementing an artificial neural network, on a basis of which is implemented an electronic product catalog having various product identities.

17. A method for adjusting parameters of a hearing system having a hearing aid device and a communication device being separate from the hearing aid device, which comprises the steps of:
using a camera of the communication device to capture at least one image of at least one component for acoustic coupling of the hearing aid device to an ear of a hearing-aid wearer;
identifying a product identity of the component from a captured image;
assigning acoustic transfer characteristics to an identified component;
adjusting the parameters of the hearing system on a basis of the acoustic transfer characteristics;
identifying the product identity of the component from the captured image on the communication device by means of an artificial neural network implemented there, by means of which an electronic product catalog is stored; and
wherein the artificial neural network in the communication device is implemented by means of at least one neuromorphic chip.

18. The method according to claim 17, which further comprises storing different products in the electronic product catalog via connections between individual neurons and/or via individual neurons of an output layer of the artificial neural network.

19. The method according to claim 18, wherein in a training phase, separate from the hearing system performing the additional steps of:
capturing images of each of the products in the electronic product catalog;
configuring a generic artificial neural network for image recognition of respective products in captured images, and thereby a first neural specimen network is implemented, wherein a topology and/or connections between individual neurons of the first neural specimen network is saved in a first file; and
transferring the first file to the communication device, and wherein in the communication device, the artificial neural network of the communication device is implemented in accordance with the topology saved in the first file and/or the connections of the first neural specimen network, and the electronic product catalog is thereby stored in the communication device.

20. The method according to claim 19, wherein for a change to the electronic product catalog, performing the following steps of:

generating a second neural specimen network corresponding to a modified electronic product catalog, a topology and/or connections of the second neural specimen network are saved in a second file;

transferring the second file to the communication device; and modifying the electronic product catalog in the communication device by implementing the second neural specimen network in the communication device on a basis of the second file.

21. A method for adjusting parameters of a hearing system having a hearing aid device and a communication device being separate from the hearing aid device, which comprises the steps of:

using a camera of the communication device to capture at least one image of at least one component for acoustic coupling of the hearing aid device to an ear of a hearing-aid wearer;

identifying a product identity of the component from a captured image;

assigning acoustic transfer characteristics to an identified component; and adjusting the parameters of the hearing system on a basis of the acoustic transfer characteristics; and calculating a gain characteristic for the hearing aid by the communication device.

* * * * *